US012656788B2

(12) United States Patent (10) Patent No.: US 12,656,788 B2
Kim et al. (45) Date of Patent: Jun. 16, 2026

(54) METHOD AND SYSTEM FOR MANAGING NAVIGATING ROBOTS IN EMERGENCY SITUATIONS

(71) Applicant: NAVER CORPORATION, Seongnam-si (KR)

(72) Inventors: Kahyeon Kim, Seongnam-si (KR); Seoktae Kim, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 80 days.

(21) Appl. No.: 18/669,637

(22) Filed: May 21, 2024

(65) Prior Publication Data

US 2024/0302846 A1 Sep. 12, 2024

Related U.S. Application Data

(63) Continuation of application No. PCT/KR2022/016733, filed on Oct. 28, 2022.

(30) Foreign Application Priority Data

Nov. 22, 2021 (KR) ........................ 10-2021-0161734

(51) Int. Cl.
*G05D 1/69* (2024.01)
*B62D 55/065* (2006.01)
*G05D 1/00* (2024.01)
(52) U.S. Cl.
CPC .................................... *G05D 1/69* (2024.01)

(58) Field of Classification Search
CPC .. B25J 9/16; B25J 11/00; G08B 17/00; G08B 7/066; B62D 55/065; G06F 3/01; G01C 21/3626; G16H 40/67; G06Q 30/0266; H04W 4/90; G05D 1/6987; G05D 1/0274
See application file for complete search history.

(56) References Cited

U.S. PATENT DOCUMENTS

| | | | |
|---|---|---|---|
| 9,387,895 B1 * | 7/2016 | Theobald ............. | B62D 55/065 |
| 10,991,216 B1 * | 4/2021 | Alali ....................... | G08B 7/066 |
| 2008/0059015 A1 * | 3/2008 | Whittaker ............ | G05D 1/0274 |
| | | | 901/1 |

(Continued)

FOREIGN PATENT DOCUMENTS

| | | |
|---|---|---|
| JP | 10-161744 A | 6/1998 |
| JP | 11-085281 A | 3/1999 |

(Continued)

OTHER PUBLICATIONS

International Search Report dated Feb. 22, 2023 issued in PCT Application No. PCT/KR2022/016733.

*Primary Examiner* — Yuri Kan

(74) *Attorney, Agent, or Firm* — Harness, Dickey & Pierce, P.L.C.

(57) ABSTRACT

A method for managing navigating robots in emergency situations is performed by one or more processors, and includes receiving a map of a target building, in which a no-stop area for emergency situations is defined in the map, receiving location information from the navigating robot, receiving an emergency situation occurrence signal, and in response to determining that the navigating robot is located in the no-stop area in emergency situations, controlling the navigating robot to move outside the no-stop area.

16 Claims, 10 Drawing Sheets

(56)                    References Cited

U.S. PATENT DOCUMENTS

| 2015/0088310 | A1 * | 3/2015 | Pinter | G16H 40/67 |
| | | | | 901/1 |
| 2018/0169866 | A1 * | 6/2018 | Wise | H04W 4/90 |
| 2019/0005545 | A1 * | 1/2019 | Roh | G06Q 30/0266 |
| 2023/0017970 | A1 * | 1/2023 | Oba | G01C 21/3626 |
| 2024/0321069 | A1 * | 9/2024 | Kuchiki | G06F 3/01 |
| 2025/0121915 | A1 * | 4/2025 | Kuchiki | G08B 7/066 |

FOREIGN PATENT DOCUMENTS

| JP | 2003140747 | A | | 5/2003 | | |
| JP | 2007286740 | A | | 11/2007 | | |
| JP | 2010277548 | A | | 12/2010 | | |
| JP | 2019-087210 | A | | 6/2019 | | |
| JP | 2020-181434 | A | | 11/2020 | | |
| KR | 10-1692688 | B1 | | 9/2016 | | |
| KR | 2019026503 | A | * | 3/2019 | | G08B 17/00 |
| KR | 2020084382 | A | * | 7/2020 | | B26J 11/00 |

* cited by examiner

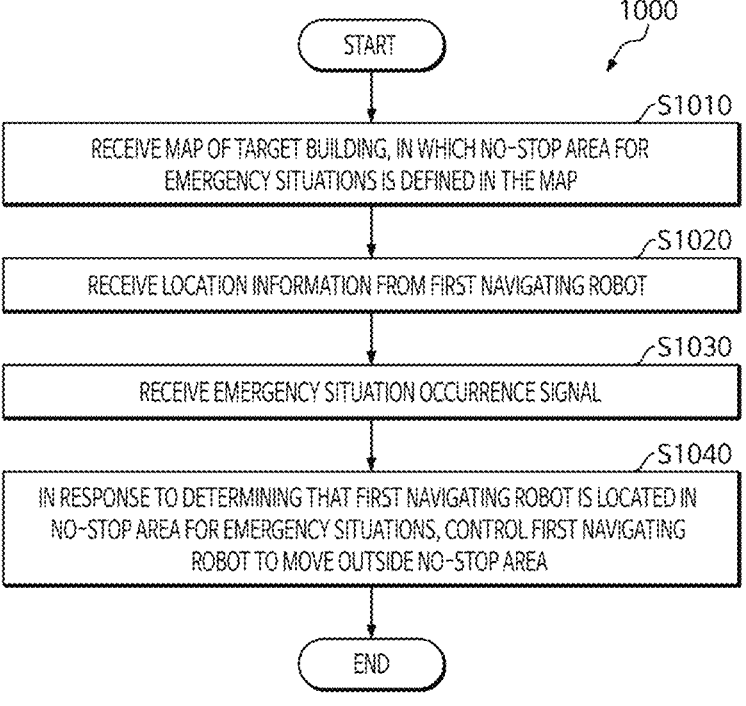

1000

START

S1010

RECEIVE MAP OF TARGET BUILDING, IN WHICH NO-STOP AREA FOR EMERGENCY SITUATIONS IS DEFINED IN THE MAP

S1020

RECEIVE LOCATION INFORMATION FROM FIRST NAVIGATING ROBOT

S1030

RECEIVE EMERGENCY SITUATION OCCURRENCE SIGNAL

S1040

IN RESPONSE TO DETERMINING THAT FIRST NAVIGATING ROBOT IS LOCATED IN NO-STOP AREA FOR EMERGENCY SITUATIONS, CONTROL FIRST NAVIGATING ROBOT TO MOVE OUTSIDE NO-STOP AREA

END

FIG. 10

METHOD AND SYSTEM FOR MANAGING NAVIGATING ROBOTS IN EMERGENCY SITUATIONS

CROSS-REFERENCE TO RELATED APPLICATION

This application is a continuation of International Patent Application No. PCT/KR2022/016733 filed on Oct. 28, 2022, which is based upon and claims the benefit of priority to Korean Patent Application No. 10-2021-0161734, filed on Nov. 22, 2021. The disclosures of the above-listed applications are hereby incorporated by reference herein in their entirety.

BACKGROUND

Technical Field

The present disclosure relates to methods, systems, and/or buildings for managing navigating robots in emergency situations, and more specifically, to methods, systems, and/or buildings for managing navigating robots to facilitate the evacuation of people in the building in emergency situations.

Description of Related Art

In recent years, facilities such as doors, gates, elevators, etc. in buildings have been automated. In emergency situations such as fire, the facilities in the building are operated according to a predetermined scenario. For example, in case of a fire, all doors and gates will be opened to facilitate the evacuation of people, and elevators that are highly likely to fail due to fire will stop operating.

Meanwhile, autonomous navigating robots arranged and driving autonomously in buildings are not fixed at specific locations, but are on the move, and if they are in the inappropriate location, they may interfere with the operation of emergency-related facilities or block evacuation routes, thereby preventing people from evacuating quickly. General building facilities such as entrance doors and gates are fixed in fixed locations, making it simple to respond to the emergency situations, but in the case of navigating robots, it is necessary to check the locations of the robots and their relationship with surrounding facilities at the time of emergency situation, and take appropriate measures accordingly, but there is a problem that it is not possible to properly control the navigating robots with a simple scenario such as in the related art.

SUMMARY

In order to address one or more problems (e.g., the problems described above and/or other problems not explicitly described herein), the present disclosure provides methods, non-transitory computer-readable recording mediums storing instructions, apparatuses (system), and/or buildings for managing navigating robots in emergency situations.

The disclosure may be implemented in a variety of ways, including methods, apparatuses (systems), computer-readable non-transitory storage mediums recording instructions, and/or buildings.

A method for managing navigating robots in emergency situations is performed by one or more processors. The method for managing navigating robots in emergency situations includes receiving a map of a target building, in which a no-stop area for emergency situations may be defined in the map, receiving location information from a first navigating robot, receiving an emergency situation occurrence signal, and in response to determining that the first navigating robot is located in the no-stop area in emergency situations, controlling the first navigating robot to move outside the no-stop area.

There is provided a computer-readable non-transitory recording medium storing instructions for executing a method for managing navigating robots in emergency situations on a computer.

A robot control system includes a memory and one or more processors connected to the memory and configured to execute one or more computer-readable programs included in the memory. The one or more processors are configured to cause the robot control system to receive a map of a target building, in which a no-stop area for emergency situations is defined in the map, receive location information from a navigating robot, receive an emergency situation occurrence signal, and in response to determining that the navigating robot is located in the no-stop area for emergency situations, control the navigating robot to move outside the no-stop area.

A building, wherein one or more navigating robots are arranged to provide services while driving in the building, includes a robot control system and the one or more navigating robots configured to be controlled by the robot control system. The robot control system includes a memory, and one or more processors connected to the memory and configured to execute one or more computer-readable programs included in the memory to cause the robot control system to receive a map of a target building, in which a no-stop area for emergency situations may be defined in the map, receive location information from a navigating robot, receive an emergency situation occurrence signal, and in response to determining that the navigating robot is located in the no-stop area for emergency situations, control the navigating robot to move outside the no-stop area.

According to some aspects of the present disclosure, by appropriately controlling the movement of the navigating robot in emergency situations, it is possible to facilitate the operation of related facilities, thereby assisting in the rapid and easy evacuation of people.

According to some aspects of the present disclosure, even when the navigating robot is not able to move outside the no-stop area, it is possible to control the navigating robot to move to an alternative stop area such that it does not interfere with rapid evacuation of people.

According to some aspects of the present disclosure, by maintaining the up-to-date map information, it is possible to respond quickly and accurately using the up-to-date map information in emergency situations.

According to some aspects of the present disclosure, by changing the robot to an emergency situation mode in emergency situations, it is possible to quickly and easily communicate the information on the emergency situation to people.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 10 is a flowchart provided to explain an example of a method for managing robots in emergency situations.

DETAILED DESCRIPTION

Figure 1:
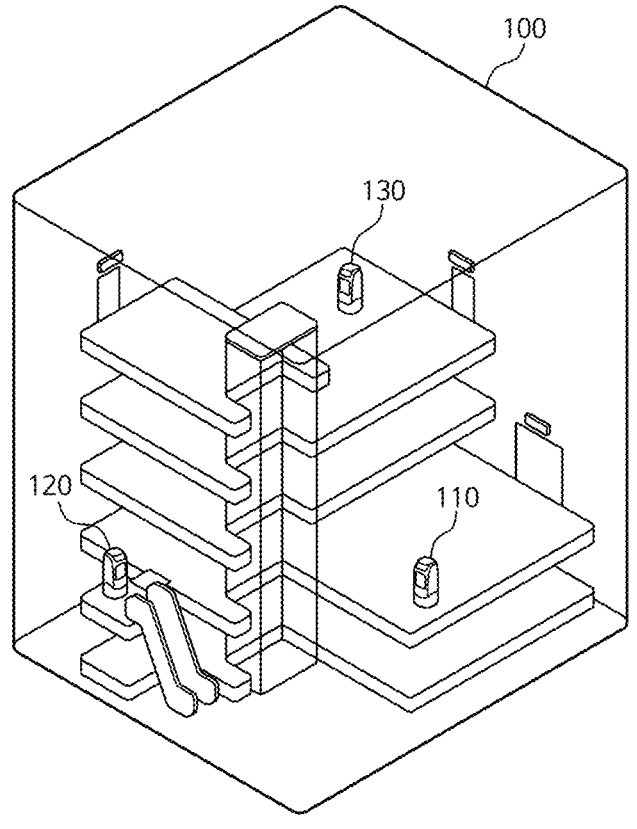
FIG. 1 is a diagram illustrating an example of navigating robots arranged inside a building.

Hereinafter, some example embodiments of the present disclosure will be described in detail with reference to the accompanying drawings. However, in the following description, detailed descriptions of well-known functions or configurations will be omitted if it makes the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of examples and methods of accomplishing the same will be apparent by referring to the examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices (e.g., a combination of a DSP and a microprocessor), a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

FIG. 1 is a diagram illustrating an example of navigating robots 110, 120, and 130 arranged inside a building 100. One or more of the navigating robots 110, 120, and 130 may autonomously drive inside the building and provide services. For example, the navigating robots 110, 120, and 130 may be arranged in a restaurant inside the building 100 to provide services such as serving food, delivering lunch boxes to people who ordered them, or driving around one or more floors without a destination, providing directions, performing cleaning tasks, etc.

The navigating robots 110, 120, and 130 may drive autonomously using a map of the building 100, and a robot control system (not shown) in communication with the navigating robots 110, 120, and 130 may determine the locations or states of the navigating robots 110, 120, and 130 in real time, and control the movements of the navigating robots 110, 120, and 130. Such a robot control system may be located inside the building 100 in which the navigating robots 110, 120, and 130 are arranged, or may be located outside of the building 100.

Meanwhile, in emergency situations such as a fire, earthquake, etc. in which people inside the building 100 need to be evacuated quickly, the navigating robots 110, 120, and 130 may be located in an inappropriate location or move improperly, and thus may hinder the evacuation of people. Accordingly, the robot control system may control the movements of the navigating robots 110, 120, and 130 in emergency situations to assist in the rapid and easy evacuation of people. For example, in emergency situations, the robot control system may use the map of the building in which no-stop areas for emergency situations are defined to determine the locations of the navigating robots 110, 120, and 130 and if the navigating robots 110, 120, and 130 are located in the no-stop areas, control the navigating robots 110, 120, and 130 to move outside the no-stop areas or move to alternative stop areas in the no-stop areas. As another example, if the navigating robots 110, 120, and 130 are located outside the no-stop areas in emergency situations, in order to ensure an evacuation route for people, it may control the navigating robots 110, 120, and 130 to move to be in close contact with the nearest walls, or if there is no nearby walls, control the navigating robots 110, 120, and 130 to stop at their current locations.

Figure 2:
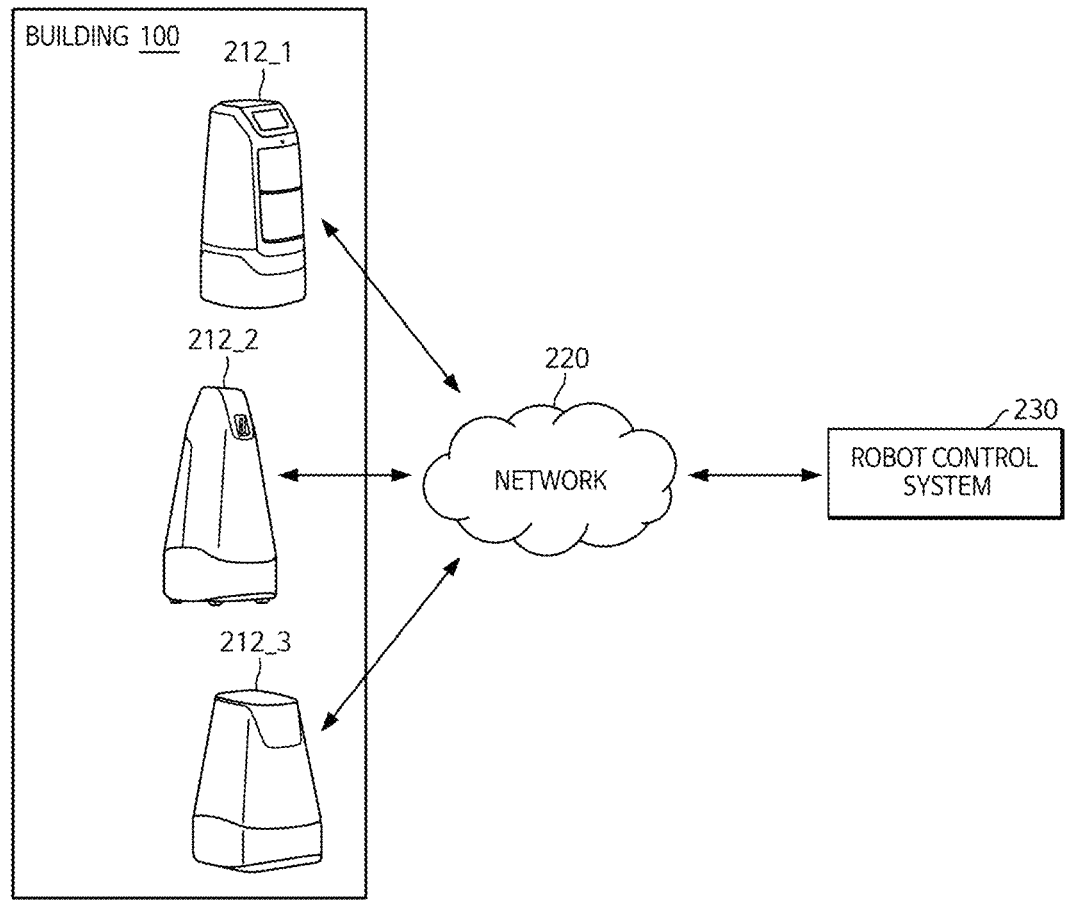
FIG. 2 is a schematic diagram illustrating a configuration in which a robot control system is communicatively connected to a plurality of robots.

FIG. 2 is a schematic diagram illustrating a configuration in which a robot control system 230 is communicatively connected to a plurality of robots 212_1, 212_2, and 212 3. As illustrated, the robot control system 230 may be configured to control the movement and/or operation of the plurality of robots 212_1, 212_2, and 212_3 through a network 220. The robot control system 230 may include one or more server devices and/or databases, or one or more distributed computing devices and/or distributed databases based on a cloud computing service capable of storing, providing, and executing computer-executable programs (e.g., downloadable applications) and data for identifying the location of the plurality of robots 212_1, 212_2, and 212_3, and controlling the movement of the robot 212. The robot control system 230 may be located inside or outside of the building 100 in which the robot 212 is located.

The plurality of robots 212_1, 212_2, and 212_3 may travel inside the building 100 and communicate with the robot control system 230 through the network 220. The network 220 may be configured to enable communication between the plurality of robots 212_1, 212_2, and 212_3 and the robot control system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, etc.) that may be included in the network 220 as well as shortrange wireless communication between the robots 212_1, 212_2, and 212_3, but aspects are not limited thereto. For example, the network 220 may include any one or more of networks including a personal area network (PAN), a local area network (LAN), a campus area network (CAN), a metropolitan area network (MAN), a wide area network (WAN), a broadband network (BBN), the Internet, etc. In addition, the network 220 may include any one or more of network topologies including a bus network, a star network, a ring network, a mesh network, a star-bus network, a tree or hierarchical network, etc., but not limited thereto.

FIG. 2 illustrates an item and food delivery robot 212_1, a guide robot 212_2, and a beverage delivery robot 212_3 as examples of the robots, but example embodiments are not limited thereto, and a plurality of robots 212_1, 212_2, and 212_3 may be any robot that is capable of wireless communication and autonomous driving. In addition, while FIG. 2 illustrates three robots 212_1, 212_2, and 212_3 in communication with the robot control system 230 through the network 220, example embodiments are not limited thereto, and accordingly, a different number of the robots 212_1, 212_2, and 212_3 may be configured to be in communication with the robot control system 230 through the network 220.

The robot control system 230 may receive location information from at least one of the robots 212_1, 212_2, and 212_3. In response to determining that the robots 212_1, 212_2, and 212_3 are located in the no-stop areas in emergency situations, the robot control system 230 may control the robots 212_1, 212_2, and 212_3 to move outside the no-stop areas. Additionally or alternatively, in response to determining that the navigating robots 212_1, 212 2, and 212_3 are unable to move outside the no-stop areas in emergency situations, the robot control system 230 may control the robots 212_1, 212_2, and 212_3 to move to alternative stop areas.

Figure 3:
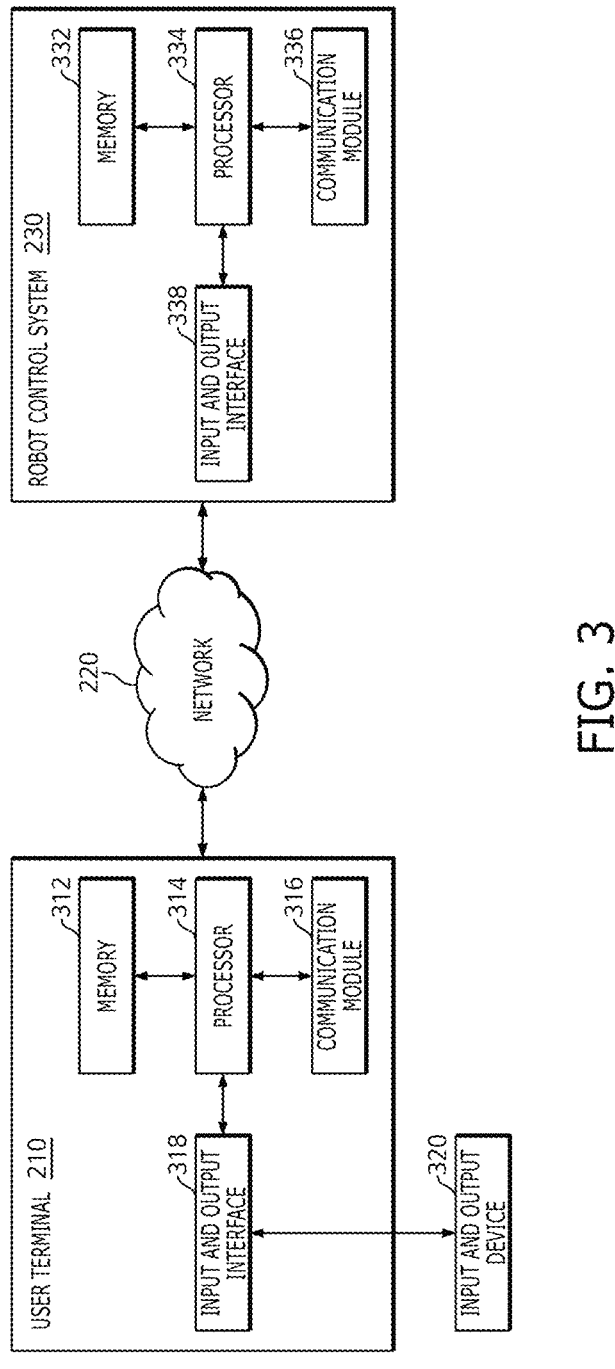
FIG. 3 is a block diagram illustrating an internal configuration of a robot and a robot control system.

FIG. 3 is a block diagram illustrating internal configurations of the robot 212 and the robot control system 230. The robots 212_1, 212_2, and 212_3 may be any computing device that is capable of wired and/or wireless communication and capable of installing and executing computer programs (e.g., applications, etc.). As illustrated, the robot 212 may include a memory 312, a processor 314, a communication module 316, and an input and output interface 318. Likewise, the robot control system 230 may include a memory 332, a processor 334, a communication module 336, and an input and output interface 338. As illustrated in FIG. 3, the robot 212 and the robot control system 230 may be configured to communicate information, data, etc. through the network 220 using respective communication modules 316 and 336. In addition, an input and output device 320 may be configured to input information and/or data to the robot 212 or to output information and/or data generated from the robot 212 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, etc. As another example, a non-destructive mass storage device such as ROM, SSD, flash memory, disk drive, etc. may be included in the robot 212 or the robot control system 230 as a separate permanent storage device that is distinct from the memory. In addition, an operating system and at least one program code (e.g., a code for autonomous driving/service provision/movement/stop, etc. installed and driven in the robot 212) may be stored in the memories 312 and 332.

These software components may be loaded from a computer-readable recording medium separate from the memories 312 and 332. Such a separate computer-readable recording medium may include a recording medium directly connectable to the robot 212 and the robot control system 230, and may include a computer-readable recording medium such as a floppy drive, a disk, a tape, a DVD/CD-ROM drive, a memory card, etc., for example. In another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the robot 212 and the robot control system 230 to communicate with each other through the network 220, and may provide a configuration or function for the robot 212 and/or the robot control system 230 to communicate with another robot, a user terminal, or another system (e.g., a separate cloud system, etc.). For example, a request or data (e.g., data on location information, data on discrepancy information between the map and the actual space inside the building, fire signals, etc.) generated by the processor 314 of the robot 212 according to a program code stored in a recording device such as the memory 312 may be transmitted to the robot control system 230 through the network 220 under the control of the communication module 316. Conversely, a control signal or command provided under the control of the processor 334 of the robot control system 230 may be received by the robot 212 through the communication module 316 of the robot 212 through the communication module 336 and the network 220. For example, the robot 212 may receive a latest map, a movement command, a movement destination or a movement path, a stop command, etc. from the robot control system 230.

The input and output interface 318 may be a means for interfacing with the input and output device 320. As an example, the input device may include a device such as a camera including an audio sensor and/or an image sensor, a keyboard, a microphone, a mouse, etc., and the output device may include a device such as a display, a speaker, a haptic feedback device, etc. As another example, the input and output interface 318 may be a means for interfacing with a device such as a touch screen, etc. that integrates a configuration or function for performing inputting and outputting. For example, when the processor 314 of the robot 212 processes the instructions of the computer program loaded into the memory 312, a service screen, etc., which is configured with the information, data, etc. provided by the robot control system 230, etc., may be displayed on the display via the input and output interface 318. While FIG. 3 illustrates that the input and output device 320 is not included in the robot 212, example embodiments are not limited thereto, and it may be configured as one device with the robot 212. In addition, the input and output interface 338 of the robot control system 230 may be a means for interfacing with a device (not illustrated) for inputting or outputting that may be connected to, or included in the robot control system 230. While FIG. 3 illustrates the input and output interfaces 318 and 338 as the components configured separately from the processors 314 and 334, example embodiments are not limited thereto, and the input and output interfaces 318 and 338 may be configured to be included in the processors 314 and 334.

The robot 212 and the robot control system 230 may include more components than those illustrated in FIG. 3. Meanwhile, most of the related components may not necessarily require exact illustration. The robot 212 may be implemented to include at least a part of the input and output device 320 described above. In addition, the robot 212 may further include other components such as a transceiver, a Global Positioning System (GPS) module, a camera, various sensors, a database, etc. For example, if the robot 212 is a delivery-only robot, the robot 212 may generally include components included in the delivery robot, and for example, may be implemented such that various components such as an acceleration sensor, a gyro sensor, a proximity sensor, a camera module, various physical buttons, buttons using a touch panel, input and output ports, a vibrator for vibration, etc. are further included in the robot 212.

The processor 314 of the robot 212 may be configured to perform autonomous driving under the control of the robot control system 230. In this case, an associated program code may be loaded into the memory 312 of the robot 212. While the robot 212 is driving, the processor 314 of the robot 212 may receive information and/or data provided from the input and output device 320 through the input and output interface 318 or receive information and/or data from the robot control system 230 through the communication module 316, and process the received information and/or data and store the result in the memory 312. In addition, such information and/or data may be provided to the robot control system 230 through the communication module 316.

While the robot is driving, the processor 314 may receive text, image, video, voice, etc. input or selected through the input device such as a camera, a microphone, etc. that includes a touch screen, a keyboard, an audio sensor and/or an image sensor connected to the input and output interface 318, and store the received text, image, video and/or voice, etc. in the memory 312, or provide it to the robot control system 230 through the communication module 316 and the network 220. For example, the processor 314 may receive fire images input through a camera including an image sensor and provide the received images to the robot control system 230 through the communication module 316 and the network 220.

The processor 314 of the robot 212 may be configured to manage, process, and/or store information and/or data received from the input and output device 320, another robot, the robot control system 230, and/or a plurality of external systems. The information and/or data processed by the processor 314 may be provided to the robot control system 230 via the communication module 316 and the network 220. The processor 314 of the robot 212 may transmit the information and/or data to the input and output device 320 via the input and output interface 318 and output the data. For example, the processor 314 may display the received information and/or data on the display of the robot 212.

The processor 334 of the robot control system 230 may be configured to manage, process, and/or store information and/or data received from the plurality of robots 212 and/or the plurality of external systems. The information and/or data processed by the processor 334 may be provided to the robot 212 via the communication module 336 and the network 220. FIG. 3 illustrates the robot control system 230 as a single system, but example embodiments are not limited thereto, and it may include a plurality of systems and servers.

The processor 334 of the robot control system 230 may be configured to output the processed information and/or data via the input and output device 320 of the robot 212, such as a device (e.g., touch screen, display, etc.) capable of outputting a display, a device (e.g., speaker) capable of outputting a voice, etc. For example, the processor 334 of the robot control system 230 may be configured to, in response to receiving an emergency situation occurrence signal, transmit data associated with a command to change to a fire mode to the robot 212 and output an emergency situation warning through a device capable of outputting a display, etc. of the robot 212. As another example, it may be configured to, in response to receiving the emergency situation occurrence signal, transmit data associated with the command to change to the fire mode to the robot 212, and output an evacuation route path or direction, etc., through a device capable of outputting a display, etc. of the robot 212.

Figure 4:
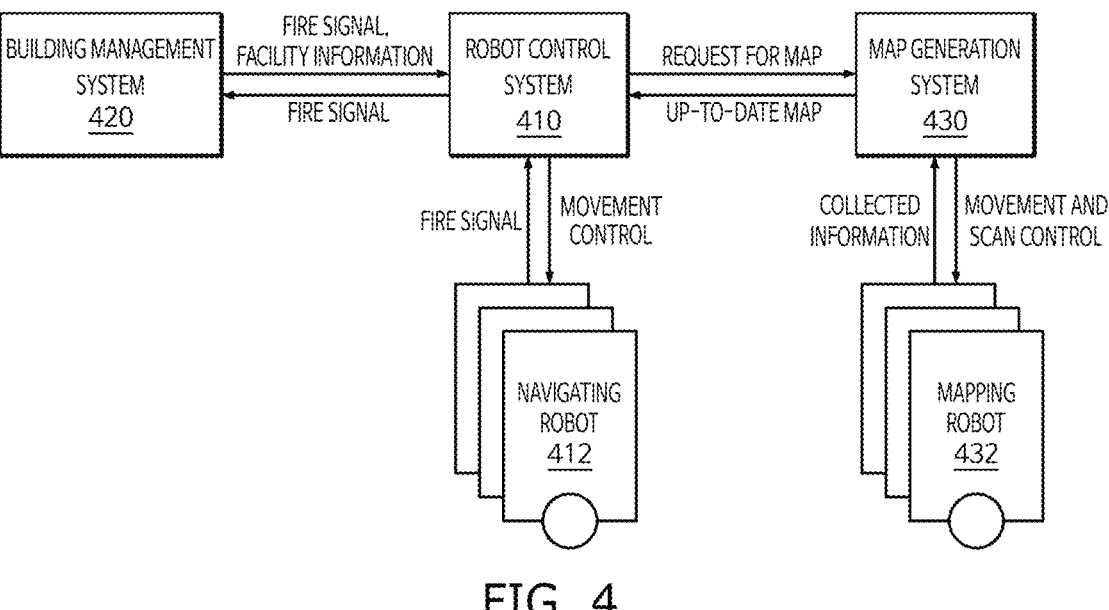
FIG. 4 is a diagram illustrating an example of the robot control system in communication with a map generation system and a building management system.

FIG. 4 is a diagram illustrating an example of a robot control system 410 in communication with a map generation system 430 and a building management system 420. A navigating robots 412 may autonomously drive and provide services inside the building. The robot control system 410 may communicate with the navigating robot 412, determine the location of the navigating robot 412, and control the movement of the navigating robot 412. Further, the robot control system 410 may communicate and interact with the building management system 420 and the map generation system 430.

A mapping robot 432 may be equipped with a camera for capturing images around the mapping robot or an object detection sensor, etc., and the mapping robot 432 may autonomously drive through the building, or move and scan inside the building under the control of the map generation system 430 in communication with the mapping robot 432. The mapping robot 432 may collect information for cartography while driving, moving, and scanning inside the building, and a map of the building may be generated with the information collected by the mapping robot 432 by, for example, a simultaneous localization and mapping (SLAM) technique. The information collected (or the map generated) by the mapping robot 432 may be transmitted to the map generation system 430.

The robot control system 410 may receive the map from the map generation system 430. For example, the robot control system 410 may receive the up-to-date map from the map generation system 430 every time the map is updated or periodically. In some example embodiments, the robot control system 410 may request the up-to-date map from the map generation system 430. For example, while driving inside the building and providing a service, the navigating robot 412 may detect a discrepancy between the actual space inside the building and the map (e.g., if there is an area of the building that is indicated as a navigable pathway on the map, but has an obstruction therein, or if it is not possible to drive through the area due to construction work, etc.). In this case, the navigating robot 412 may transmit the detected discrepancy information (e.g., information on a location where there is the discrepancy between the map and the actual space inside the building) to the robot control system 410. The robot control system 410 may transmit a request for map including the received discrepancy information to the map generation system 430. The map generation system 430 may determine whether or not the discrepancy information is temporary and, if the discrepancy is not temporary, update the map to resolve the discrepancy. The map generation system 430 may provide a map (an updated map) with the discrepancy resolved to the robot control system 410 as an up-to-date map. As described above, the map generation system 430 is able to maintain the up-to-date map to allow for an accurate response to emergency situations using up-to-date information.

A no-stop area, an alternative stop area in the no-stop area, etc. for emergency situations may be defined in the map. The no-stop area may be defined as an area where the navigating robot 412 may not stop in emergency situations for the rapid and easy evacuation of people and normal operations of emergency-related facilities in emergency situations. The alternative stop area may be defined in the no-stop area so that the navigating robot 412 stops in the defined area in the no-stop area instead, if the navigating robot 412 is unable to move outside the no-stop area for certain or predetermined reasons (e.g., if it is not possible to move outside the no-stop area because a fire door or fire shutter is closed) in emergency situations.

The areas (no-stop area, alternative stop area) described above may be set automatically based on information on the facilities included in the map. Additionally or alternatively, the areas described above may be edited or manually set by a manager of the robot control system 410. For example, if the map (e.g., map automatically generated by the mapping robot) includes information on fire doors and fire shutters, a certain or predetermined area that includes the fire doors or fire shutters may be automatically set as the no-stop areas. The facility information may be manually set by the manager of the robot control system 410 and/or the map generation system 430, or may be received from the building management system 420. Additionally or alternatively, the facility information may be information obtained by performing object recognition based on the information collected by the mapping robot 432.

The robot control system 410 may receive an emergency situation signal such as a fire signal from the navigating robot 412 that detected an emergency situation and/or from the building management system 420 that received the emergency situation signal. Upon receiving the emergency situation signal such as a fire signal from the navigating robot 412, the robot control system 410 may in turn transmit the emergency situation signal such as a fire signal to the building management system 420. For example, the navigating robot 412 may detect fire images, heat or smoke, etc., through a camera including an image sensor mounted on the navigating robot 412, a heat sensor, a smoke sensor, etc., and transmit the fire signal to the robot control system 410.

Upon receiving the emergency situation signal, the robot control system 410 may determine the location of the navigating robot 412 and control the movement of the navigating robot 412 located in the no-stop area. For example, the robot control system 410 may control the navigating robot 412 located in the no-stop area to move outside the no-stop area. As another example, if it is determined that the navigating robot 412 located in the no-stop area cannot move outside the no-stop area, it may control the corresponding navigating robot 412 to move to the alternative stop area in the no-stop area.

Additionally or alternatively, upon receiving the emergency situation signal, the robot control system 410 may determine the location of the navigating robot 412 and control the movement of the navigating robot 412 located outside the no-stop area. For example, if it is determined that there is a wall within a certain or predetermined distance (e.g., 2 m) from the navigating robot 412 located outside the no-stop area, it may control the navigating robot 412 to move into a close contact with the nearest wall. As another example, if it is determined that there is no wall within a certain or predetermined distance from the navigating robot 412 located outside the no-stop area, the navigating robot 412 may be controlled to stop at the current location. As described above, the map generation system 430 may control the movement of the navigating robot 412 in emergency situations, so that the operation of the emergency situation-related facility may not be interfered by the navigating robot 412, and people in the building may evacuate quickly and easily.

FIG. 4 illustrates the robot control system 410, the building management system 420, and the map generation system 430 as separate systems, but example embodiments are not limited thereto, and at least two of the systems described above may be implemented as one system. In addition, FIG. 4 illustrates the navigating robot 412 and the mapping robot 432 as separate robots, but example embodiments are not limited thereto, and they may be implemented differently in other example embodiments. For example, at least one robot may perform roles of both the navigating robot 412 and the mapping robot 432. In this case, the robot that performs roles of both the navigating robot 412 and the mapping robot 432 may produce a map of the building using the simultaneous localization and mapping (SLAM) technique and may also provide a desired (or alternatively, predetermined) service inside the building, while driving, moving and scanning inside the building.

Figure 5:
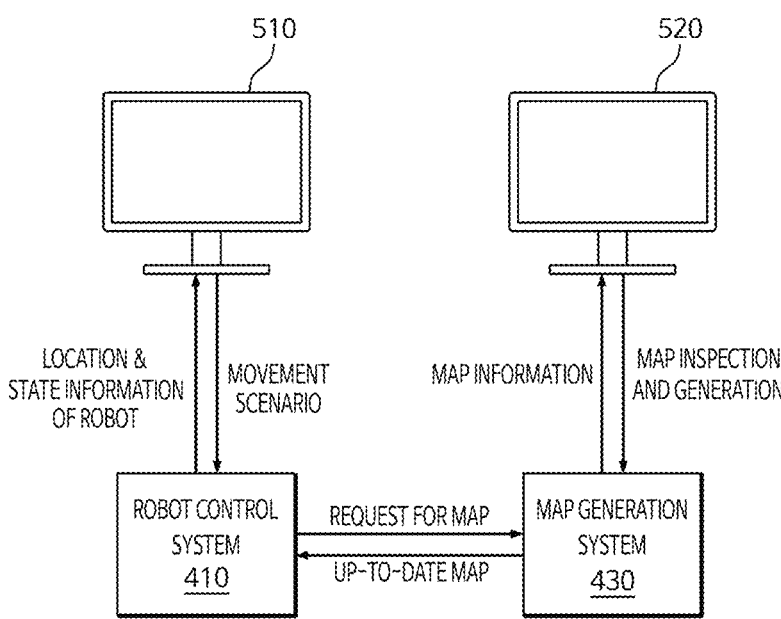
FIG. 5 is a diagram illustrating an example of the robot control system communicating and interacting with the map generation system.

FIG. 5 is a diagram illustrating an example in which the robot control system 410 communicates and interacts with the map generation system 430. As illustrated, the robot control system 410 may communicate with a manager terminal 510. Similarly, the map generation system 430 may communicate with a manager terminal 520.

The map generation system 430 may transmit the map produced by the mapping robot to the manager terminal 520, and the manager of the map generation system 430 may check and inspect the map produced through the manager terminal 520 to generate and update the map. The up-to-date map generated by the manager of the map generation system 430 may be transmitted to the robot control system 410 and used for controlling the movement of the robot.

The map generation system 430 may receive, from the robot control system 410, information on the discrepancy between the actual space of the building and the map. The manager of the map generation system 430 may check the discrepancy information through the manager terminal 520 and determine whether or not the received discrepancy is temporary. For example, if the discrepancy is caused by a temporary obstacle (a walker) in the driving pathway, it may be determined that the received discrepancy is temporary. As another example, if facilities (e.g., sculptures, etc.) are newly arranged resulting in a discrepancy, it may be determined that the received discrepancy is not temporary. If it is determined that the received discrepancy is not temporary, the manager of the map generation system 430 may generate an up-to-date map in which the discrepancy is resolved by reflecting the changed information. The map generation system 430 may provide the up-to-date map with the discrepancy resolved to the robot control system 410. The map generation system 430 may automatically determine whether the received discrepancy is temporary.

The robot control system 410 may transmit location and state information of one or more navigating robots to the manager terminal 510, and the manager of the robot control system 410 may check the information through the manager terminal 510. The location and state information of the navigating robot transmitted to the manager terminal 510 may include a detailed location of the navigating robot, whether the navigating robot is located in the no-stop area, whether the navigating robot is moving or stopping, whether the navigating robot is providing a service, etc.

The manager of the robot control system 410 may manually set, through the manager terminal 510, the no-stop areas and the alternative stop areas for emergency situations in the map, and may set a movement scenario for the navigating robot for emergency situations. For example, a movement scenario may be set, according to which the navigating robot located in the first area is moved to the second area in emergency situations. In another example, a navigating robot located outside the no-stop area for emergency situations may be controlled to move close to the nearest wall or to stop in its place depending on its distance to the nearest wall, and a distance to the nearest wall, which serves as a criteria for this determination, may be set by the manager. The movement scenario for the navigating robot for emergency situations may be set in advance and stored in the robot control system 410 before the emergency situation occurs. Additionally or alternatively, in emergency situations, the manager may check the locations and/or states of the navigating robots in real time through the manager terminal 510 and manually control the movements of the navigating robots.

Figure 6:
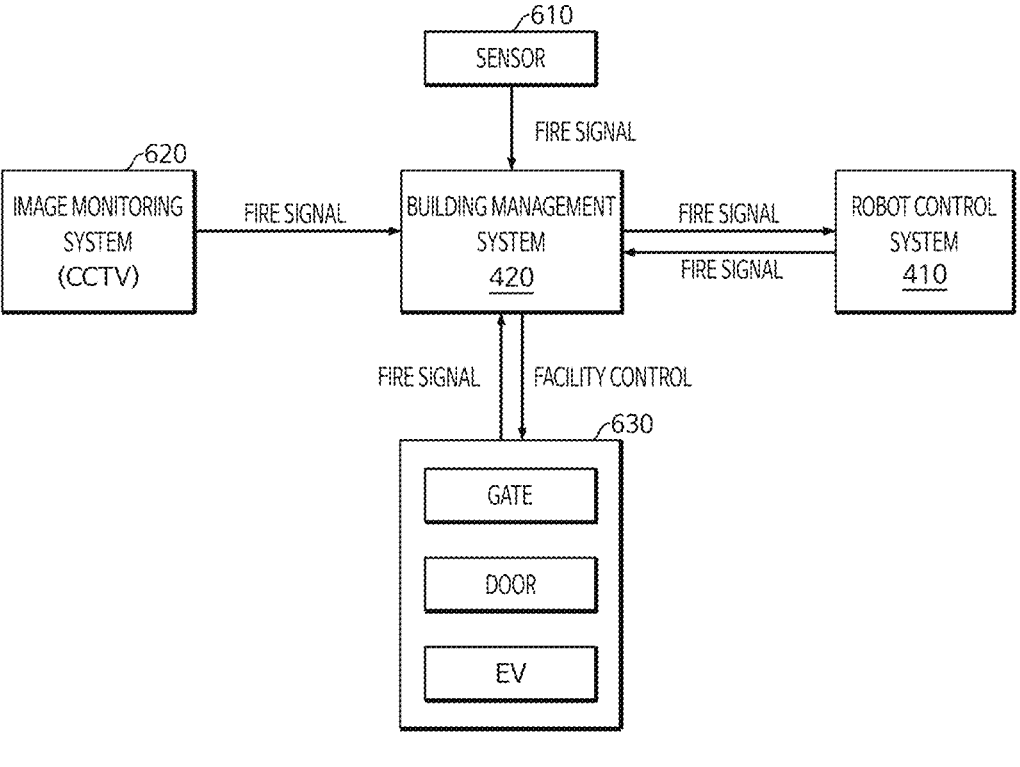
FIG. 6 is a diagram illustrating an example of the robot control system communicating and interacting with the building management system.

FIG. 6 is a diagram illustrating an example in which the robot control system 410 communicates and interacts with the building management system 420. As illustrated, the building management system 420 may communicate with a sensor 610, an image monitoring system (CCTV) 620, facilities 630, and the robot control system 410. The facilities 630 may include a gate, a door, an elevator, etc.

The building management system 420 may receive an emergency situation signal such as a fire signal from at least one of the sensor 610, the image monitoring system 620, the facilities 630, or the robot control system 410. For example, the building management system 420 may receive a fire signal from a fire detection sensor such as a smoke detection sensor, a heat detection sensor, etc., or receive a fire signal detected from an image sensor included in the image monitoring system 620 from the image monitoring system 620. As another example, the building management system 420 may receive a fire signal from the facilities 630 (or a sensor mounted on the facilities 630, etc.). As another example, the building management system 420 may receive a fire signal detected by the navigating robots in communication with the robot control system 410 from the robot control system 410. Upon receiving the emergency situation signal, the building management system 420 may control the facilities 630 to respond to the emergency situation. For example, upon receiving a fire signal, the building management system 420 may close a fire door, a fire shutter, or stop the operation of the elevator.

If the building management system 420 receives the emergency situation signal from the devices 610, 620, and/or 630 other than the robot control system 410, the building management system 420 may transmit the emergency situation signal such as a fire signal to the robot control system 410. In this case, the robot control system 410 may control the movement of the robot for the normal operation of the facilities 630 (e.g., emergency-related facilities) and the rapid and easy evacuation of people. As described above, as the robot control system 410 quickly receives or transmits the emergency situation signal in emergency situations, the operation of the facilities 630 related to the response to the emergency situation or the rapid evacuation of people can be smoothly performed.

Figure 7:
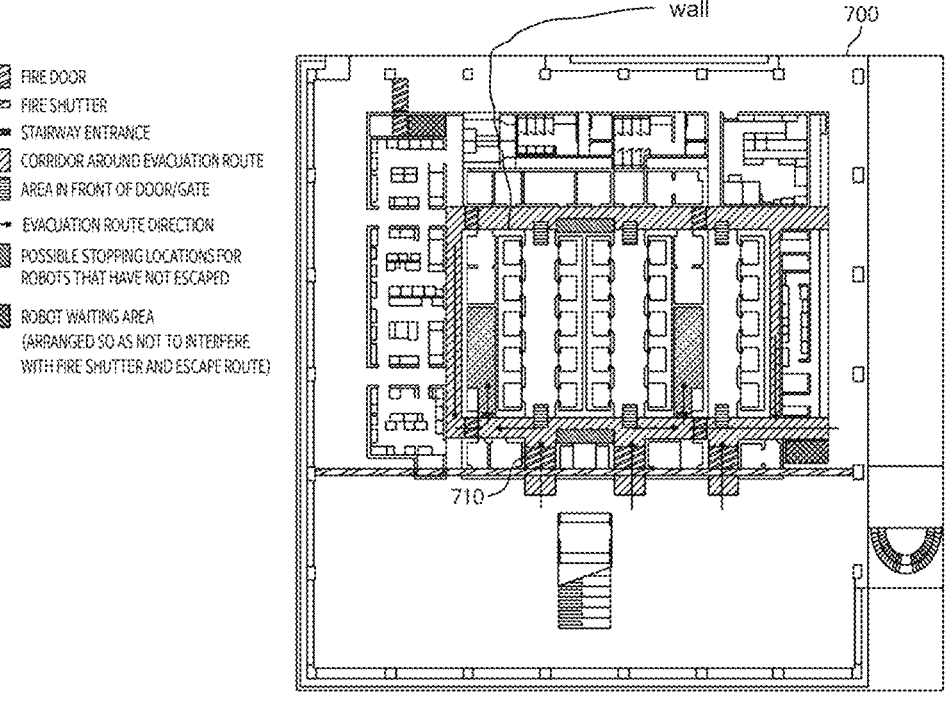
FIG. 7 is a diagram illustrating an example of a map in which no-stop areas and alternative stop areas for emergency situations are defined.

FIG. 7 is a diagram illustrating an example of a map 700 in which no-stop areas and alternative stop areas for emergency situations are defined. The no-stop areas, the alternative stop areas (in FIG. 7 "possible stopping locations for robots that have not escaped") in the no-stop areas, etc. for emergency situations may be defined in the map 700. The no-stop area may be defined to be the area where the navigating robot may not stop in emergency situations for the rapid and easy evacuation of people and normal operations of emergency-related facilities in emergency situations. Further, the alternative stop area may be defined in the no-stop area so that the navigating robot stops in the defined area if the navigating robot is unable to move outside the no-stop area for certain or predetermined reasons (e.g., if it is not possible to move outside the no-stop area because a fire door 710 or a fire shutter is closed) in emergency situations.

The no-stop area may include an area in which the fire door 710, a fire shutter, etc. are located. The fire door 710 or the fire shutter may be automatically closed in case of fire, and if the navigating robot is located in the area where the fire door 710 or the fire shutter is located, the fire door 710 or the fire shutter may not be properly closed. Therefore, areas where the fire door 710 and/or the fire shutter is located, and areas in the radius of rotation at which the fire door 710 is closed may be defined as the no-stop areas.

The no-stop area may include an area where the evacuation route is located. In emergency situations, people in the building must evacuate through the evacuation route, and a navigating robot located in this area may interfere with the rapid and easy evacuation of people. Accordingly, the evacuation route area may be defined as the no-stop area. For example, the evacuation route may include an area in front of the stairwell, a main evacuation route to the stairwell, an area in front of the door and the gate (including the fire door 710), and a corridor around the evacuation route.

The no-stop area may include a narrow corridor. The narrow corridor may include, for example, a corridor having a width that is within a desired (or alternatively, predetermined) threshold (e.g., 1.5 m). The narrow corridor may be defined as the no-stop area because, if the navigating robot is located in the narrow corridor, it may significantly interfere with the evacuation of people.

The robot control system may check in real time whether the navigating robot is located in the no-stop area using the map 700 in which the no-stop areas (and alternative stop area) described above are defined. In addition, in emergency situations, the robot control system may control the navigating robot located in the no-stop area to move outside the no-stop area or to move to the alternative stop area in the no-stop area.

The map 700 may include an evacuation route path ('direction of evacuation route' in FIG. 7) for people to evacuate in emergency situations. Using this information and information such as location information and pose of each navigating robot, the robot control system may control so that the evacuation route is displayed on a display of each navigating robot.

Figure 8:
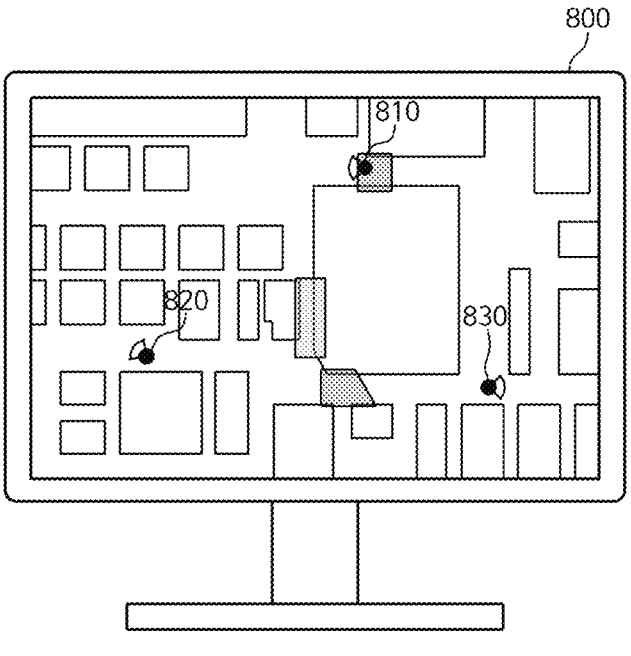
FIG. 8 is a diagram illustrating an example in which a map with no-stop areas defined therein, and current locations of the navigating robots are displayed on a manager terminal of the robot control system.

FIG. 8 is a diagram illustrating an example in which a map with no-stop areas defined therein, and current locations of the navigating robots 810, 820, and 830 are displayed on a manager terminal of the robot control system. A manager of the robot control system may set the no-stop area through the manager terminal 800. For example, in FIG. 8, a map showing a no-stop area in a shaded rectangle is illustrated. The manager may newly set such an area or edit an already set no-stop area.

The manager of the robot control system may check, through the manager terminal 800, the map with the no-stop area defined therein, and the current locations of the navigating robots 810, 820, and 830, and from this, easily determine whether the navigating robots 810, 820, and 830 are located in the no-stop area.

The manager of the robot control system may set, through the manager terminal 800, movement scenarios for the navigating robots 810, 820, and 830 for emergency situations. For example, a movement scenario may be set, according to which the navigating robot located in the first area stops in its place in emergency situations. As another example, the navigating robots 820 and 830 located outside the no-stop area for emergency situations may be controlled to be in close contact with the wall or to stop in its place depending on the distances from the navigating robots 820 and 830 to the nearest wall. The manager may set a distance to the nearest wall which serves as a criteria for this determination. The movement scenarios for the navigating robots 810, 820, and 830 for emergency situations may be set in advance by the manager and stored in the robot control system before the emergency situation occurs. Additionally or alternatively, in emergency situations, the manager may check the locations and/or states of the navigating robots 810, 820, and 830 in real time through the manager terminal 800, and manually control the movements of the navigating robots 810, 820, and 830.

Figure 9:
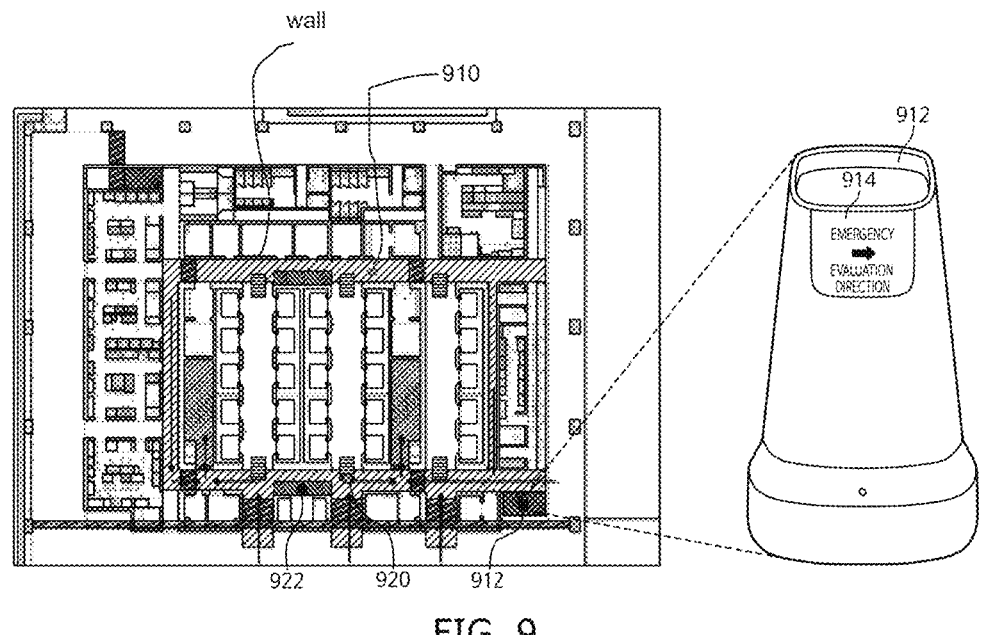
FIG. 9 is a diagram illustrating an example of the navigating robots moving according to movement scenarios in response to emergency situations and being changed to emergency situation mode.

FIG. 9 is a diagram illustrating an example of navigating robots 910 and 920 moving according to movement scenarios in response to emergency situations and being changed to emergency situation mode. The robot control system receiving the emergency situation signal may control the navigating robots 910 and 920 to move according to the movement scenarios. For example, in emergency situations, the robot control system may control the first navigating robot 910 located in the no-stop area to move outside the no-stop area.

Among the navigating robots located in the no-stop area, there may be a navigating robot 920 that cannot move outside the no-stop area. For example, the fire door and fire shutter may be automatically closed due to the occurrence of a fire, and in this case, the second navigating robot 920 illustrated in FIG. 9 may not be able to exit the no-stop area because the path to exit the no-stop area is all closed by the fire door and fire shutter. Whether the navigating robots 910 and 920 located in the no-stop area are able to move outside the no-stop area or not may be determined by the robot control system in consideration of facility information, etc., or may be directly determined by the navigating robots 910 and 920 and transmitted to the robot control system. For example, if navigating robot moving in the no-stop area according to a movement command from the robot control system is not able to move to a commanded destination due to an obstacle, the navigating robot may transmit a signal that it cannot move to the robot control system. Upon determining or being informed that the second navigating robot 920 cannot move outside the no-stop area, the robot control system may control the second navigating robot 920 to move to the alternative stop area in the no-stop area. The alternative stop area is an area in the no-stop area that reduces or minimizes interference with the operation of emergency-related facilities or the evacuation of people, and may be set by the manager.

The navigating robots 912 and 922 that completed moving and stopping by the movement control of the robot control system may be changed to the emergency situation mode. For example, as illustrated, on a display 914 of the first navigating robot that completed moving outside the no-stop area and stopping, a warning notifying that it is an emergency situation, an evacuation route path, etc. may be displayed. Additionally or alternatively, a warning notification, etc. indicating that it is an emergency situation may be output through speakers of the navigating robots 912 and 922. FIG. 9 illustrates and describes that the navigating robots 912 and 922 are changed to the emergency mode after completing moving and stopping, but example embodiments are not limited thereto, and the navigating robots 910 and 920 may be changed to the emergency situation mode immediately after receiving the emergency situation signal. People in the building may check the warning, routes, etc. displayed on the displays 914 of the navigating robots that are changed to the emergency situation mode, recognize that it is an emergency situation, and easily check the evacuation routes and quickly evacuate the building.

FIG. 10 is a flowchart illustrating an example of a method 1000 for managing robots in emergency situations. The method 1000 may be initiated by a processor (e.g., at least one processor of the robot control system) receiving a map of a target building, in which the no-stop areas for emergency situations are defined, at S1010. The map of the target building may be received from an external device (e.g., map generation system), and the processor may receive an update notification from the external device and perform updates every time the map is updated. Thus, the map reflects the latest situation, and allows accurate response to emergency situations.

The no-stop area may include areas in which the navigating robot, if located therein, interferes with people's evacuation in emergency situations. For example, the no-stop area may include an area associated with at least one of a fire door, a fire shutter, an evacuation route, a stairway entrance, a corridor around the evacuation route, a doorway, or a corridor with a width equal to or less than a certain or predetermined threshold (e.g., 2 m). The map may define not only the no-stop areas but also alternative stop areas in the no-stop areas. The alternative stop area may include an area for the robot to stop when the navigating robot in the no-stop area cannot move outside the no-stop area.

At least a part of the no-stop area and the alternative stop area in the no-stop area described above may be manually set by a manager (e.g., a manager of the robot control system), and the manager may set or edit the no-stop area and/or the alternative stop area, etc. through a user terminal (e.g., a manager's terminal in communication with the robot control system). At least a part of the no-stop area and the alternative stop area may be automatically set based on the facility information included in the map. For example, if the map includes information on the location and extent of the fire door, the fire shutter, the stairway entrance, etc., the area with the fire door, fire shutter, stairway entrance, etc. may be automatically set as the no-stop areas. Like the no-stop areas, etc., the facility information may also be directly set by the manager, or it may be received from the building management system that manages the target building.

In normal circumstances, when there is no emergency situation, the navigating robots arranged in the target building may autonomously drive in the space in the building including the no-stops areas. In addition, if the navigating robot finds a discrepancy between the actual space of the target building and the map while driving, the robot may notify the robot control system of the discrepancy. The processor of the robot control system may receive the discrepancy information between the actual space of the target building and the map from the navigating robot and transmit the discrepancy information to an external device (e.g., map generation system) related to generating the map. In this case, the external device may check the discrepancy information, update the map by reflecting the discrepancy information, and transmit the map in which the discrepancy is resolved to the robot control system, and the processor of the robot control system may receive the map in which the discrepancy is resolved from the external device.

The processor may receive location information from one or more navigating robots arranged in the target building, at S1020. For example, the processor may receive the location information from a first navigating robot and/or a second navigating robot arranged in the target building in real time or periodically, check the location of the first navigating robot and/or the second navigating robot, and control the movement of the first navigating robot and/or the second navigating robot, etc.

The processor may receive an emergency situation occurrence signal, at S1030. The emergency situation occurrence signal may include a signal requiring rapid evacuation of people in the building, such as a fire signal and an earthquake signal. The emergency situation occurrence signal may be received from at least one of the navigating robots, the fire detection sensor, the image sensor, the user terminal (e.g., the manager terminal of the robot control system), or the building management system that manages the target building. For example, the manager of the robot control system may detect the occurrence of a fire and change the robot control system to the emergency situation mode through the manager terminal.

The processor may appropriately move or stop the navigating robot located in the target building for quick and easy evacuation of people in emergency situations. For example, in response to determining that the first navigating robot is located in the no-stop area in emergency situations, the processor may control the first navigating robot to move outside the no-stop area, at S1040. If the processor determines that the first navigating robot located in the no-stop area is not able to move outside the no-stop area in emergency situations, in response, the processor may control the first navigating robot to move to the alternative stop area.

In response to determining that the second navigating robot is located outside the no-stop area in emergency situations and that there is a wall within a certain or predetermined distance (e.g., 2 m) from the second navigating robot, the processor may control the second navigating robot to move to the nearest wall. If the processor determines that there is no wall within the certain or predetermined distance from the second navigating robot located outside the no-stop area in emergency situations, in response, the processor may control the second navigating robot to stop at the current location.

In emergency situations, the processor may change the navigating robots in the building to the emergency situation mode. For example, in response to receiving the emergency situation occurrence signal, the processor may control the navigating robot to display an emergency situation warning on the display. As another example, in response to receiving the emergency situation occurrence signal, the processor may control the navigating robot to display the evacuation route path or direction, etc. on the display. In addition, in emergency situations, the processor may control so that an emergency warning sound, an emergency notification broadcast, an evacuation notification broadcast, etc. is output through a speaker mounted on the navigating robot.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An example storage medium may be connected to the processor such that the processor may read or write information from or to the storage medium. In some example embodiments, the storage medium may be integrated into the processor. The processor and the storage medium may be present in the ASIC. The ASIC may exist in the user terminal. In some example embodiments, the processor and storage medium may exist as separate components in the user terminal.

Although the examples described above have been described as utilizing aspects of the currently disclosed subject matter in one or more standalone computer systems, example embodiments are not limited thereto, and may be implemented in conjunction with any computing environment, such as a network or distributed computing environment. Furthermore, some example embodiments of the present disclosure may be implemented in multiple processing chips or apparatus, and storage may be similarly influenced across a plurality of apparatus. Such apparatus may include PCs, network servers, and portable apparatus.

Although the present disclosure has been described in connection with some example embodiments herein, various modifications and changes can be made without departing from the scope of the present disclosure, which can be understood by those skilled in the art to which the present disclosure pertains. Additionally, such modifications and changes should be considered to fall within the scope of the claims appended hereto.

What is claimed is:

1. A method for managing navigating robots in emergency situations, the method being performed by one or more processors and comprising:

receiving a map of a target building, from an external source, wherein a no-stop area for emergency situations is defined in the map as a first area where the navigating robots are not allowed to stop in emergency situations;

receiving first location information from a first navigating robot from among the navigating robots;

receiving an emergency situation occurrence signal;

in response to receiving the emergency situation occurrence signal, checking a location of the first navigating robot;

determining, based on the map, whether the first navigating robot is located in the no-stop area;

in response to determining that the first navigating robot is located in the no-stop area, controlling the first navigating robot to move outside the no-stop area, and in response to determining that the first navigating robot is located outside the no-stop area, controlling the first navigating robot to move to a position within a predetermined distance from a first wall that is nearest to the first navigating robot among a plurality of walls.

2. The method according to claim 1, wherein the map further defines an alternative stop area in the no-stop area, and the method further includes, in response to determining that the first navigating robot is not able to move outside the no-stop area, controlling the first navigating robot to move to the alternative stop area.

3. The method according to claim 1, further comprising:

receiving second location information from a second navigating robot; and in response to determining that the second navigating robot is located outside the no-stop area and a second wall is within a distance from the second navigating robot, controlling the second navigating robot to move to the second wall.

4. The method according to claim 1, further comprising:

receiving second location information from a second navigating robot; and in response to determining that the second navigating robot is located outside the no-stop area and that no wall is within a distance from the second navigating robot, controlling the second navigating robot to stop at a current location thereof.

5. The method according to claim 1, further comprising, before receiving the emergency situation occurrence signal:

receiving, from the first navigating robot, discrepancy information between actual space of the target building and the map;

transmitting the discrepancy information to an external device; and receiving, from the external device, the map in which discrepancy is resolved.

6. The method according to claim 1, further comprising:

controlling the first navigating robot to move in the no-stop area in a non- emergency situation.

7. The method according to claim 1, wherein the no-stop area includes a second area associated with at least one of a fire door, a fire shutter, an evacuation route, a stairway entrance, a first corridor around the evacuation route, a doorway, or a second corridor with a width equal to or less than a threshold value.

8. The method according to claim 1, wherein at least a part of the no-stop area is automatically set based on facility information included in the map.

9. The method according to claim 1, wherein the emergency situation occurrence signal is received from at least one of the first navigating robot, a fire detection sensor, an image sensor, a user terminal, or a building management system that is configured to manage the target building.

10. The method according to claim 1, further comprising:

in response to receiving the emergency situation occurrence signal, controlling the first navigating robot to display an emergency situation warning on a display.

11. The method according to claim 1, further comprising:

in response to receiving the emergency situation occurrence signal, controlling the first navigating robot to display an evacuation route path on a display.

12. A robot control system, comprising:

a memory; and one or more processors connected to the memory and configured to execute one or more computer-readable programs included in the memory to cause the robot control system to receive a map of a target building, from an external source, wherein a no-stop area for emergency situations is defined in the map as an area where navigating robots are not allowed to stop in emergency situations, receive location information from a navigating robot from among the navigating robots, receive an emergency situation occurrence signal, in response to receiving the emergency situation occurrence signal, check a location of the navigating robot, determine, based on the map, whether the navigating robot is located in the no-stop area, in response to determining that the navigating robot is located in the no-stop area, control the navigating robot to move outside the no-stop area, and in response to determining that the navigating robot is located outside the no-stop area, control the navigating robot to move to a position within a predetermined distance from a first wall that is nearest to the navigating robot among a plurality of walls.

13. A building, wherein one or more navigating robots are arranged to provide services while driving in the building, comprising:

the one or more navigating robots configured to be controlled by a robot control system, and the robot control system including, a memory, and one or more processors connected to the memory and configured to execute one or more computer-readable programs included in the memory to cause the robot control system to receive a map of a target building, from an external source, wherein a no-stop area for emergency situations is defined in the map as an area where the one or more navigating robots are not allowed to stop in emergency situations, receive first location information from a first navigating robot from among the one or more navigating robots, receive an emergency situation occurrence signal, in response to receiving the emergency situation occurrence signal, check a location of the first navigating robot, determine, based on the map, whether the first navigating robot is located in the no-stop area, in response to determining that the first navigating robot is located in the no-stop area, control the first navigating robot to move outside the no-stop area, and in response to determining that the first navigating robot is located outside the no-stop area, control the first navigating robot to move to a position within a predetermined distance from a first wall that is nearest to the first navigating robot among a plurality of walls.

14. The building according to claim 13, wherein the map further defines an alternative stop area in the no-stop area, and the one or more processors are configured to cause the robot control system to, in response to determining that the first navigating robot is not able to move outside the no-stop area, control the first navigating robot to move to the alternative stop area.

15. The building according to claim 13, wherein the one or more processors are configured to cause the robot control system to receive second location information from a second navigating robot, and in response to determining that the second navigating robot is located outside the no-stop area and that a first wall is within a distance from the second navigating robot, control the second navigating robot to move to the first wall.

16. The building according to claim 13, wherein the one or more processors are configured to cause the robot control system to receive second location information from a second navigating robot, and in response to determining that the second navigating robot is located outside the no-stop area and that no wall is within a distance from the second navigating robot, control the second navigating robot to stop at a current location thereof.

* * * * *